(12) United States Patent
Gomo (10) Patent No.: US 7,857,625 B2
(45) Date of Patent: Dec. 28, 2010

(54) MEDICAL PATIENT STIMULATOR

(75) Inventor: Oystein Gomo, Hundvag (NO)

(73) Assignee: Laerdal Medical AS, Stavanger (NO)

( * ) Notice: Subject to any disclaimer, the term of this patent is extended or adjusted under 35 U.S.C. 154(b) by 129 days.

(21) Appl. No.: 10/595,306

(22) PCT Filed: Oct. 6, 2004

(86) PCT No.: PCT/NO2004/000298

§ 371 (c)(1),
(2), (4) Date: Nov. 17, 2006

(87) PCT Pub. No.: WO2005/032327

PCT Pub. Date: Apr. 14, 2005

(65) Prior Publication Data

US 2007/0087314 A1    Apr. 19, 2007

(30) Foreign Application Priority Data

Oct. 6, 2003    (NO) .................................. 20034465

(51) Int. Cl.
*G09B 23/28* (2006.01)
(52) U.S. Cl. ....................... 434/267; 446/373
(58) Field of Classification Search ................ 434/265, 434/270, 262, 267, 268, 272, 273
See application file for complete search history.

(56) References Cited

U.S. PATENT DOCUMENTS

| | | | |
|---|---|---|---|
| 1,974,366 A * | 9/1934 | Pollock | 446/339 |
| 2,551,433 A * | 5/1951 | Graves | 434/273 |
| 3,049,811 A | 8/1962 | Ruben | |
| 3,224,139 A | 12/1965 | Reuge | |
| 3,520,071 A | 7/1970 | Abrahamson et al. | |
| 3,662,076 A * | 5/1972 | Gordon et al. | 434/266 |
| 3,736,362 A | 5/1973 | Laerdal | |
| 4,001,950 A | 1/1977 | Blumensaadt | |
| 4,003,141 A * | 1/1977 | Le Roy | 434/270 |
| 4,318,399 A * | 3/1982 | Berndtsson | 128/204.23 |
| 4,606,328 A * | 8/1986 | Thoman | 600/27 |
| 4,915,635 A * | 4/1990 | Ingenito et al. | 434/396 |

(Continued)

FOREIGN PATENT DOCUMENTS

DE    3049583 A1    7/1982

(Continued)

*Primary Examiner*—Kathleen Mosser
*Assistant Examiner*—Jerry Fletcher
(74) *Attorney, Agent, or Firm*—Brooks Kushman P.C.

(57) ABSTRACT

Medical patient simulator comprising a torso (2) that contains an artificial lung (6), a chest skin (3) and means (8, 9) for pulling the chest skin (3) downward in an area corresponding with an area where such retractions occur on a human being. The simulator also provides for changes in the compliance of the lung (6). The lung (6) is situated between two plates (5, 7), the spacing of which can be adjusted. The torso (2) has one actuator (23, 24) on each side of the back to simulate muscular activity. It includes a system for control of pneumatic functions by measuring a representative pressure for each actuator and stopping the filling when a pre-set pressure is reached. It also includes a head with one or more air cushions in a fontanelle area on the head, which may be filled with air to simulate an increased pressure in the brain.

9 Claims, 6 Drawing Sheets

U.S. PATENT DOCUMENTS

| | | |
|---|---|---|
| 4,932,879 A | 6/1990 | Ingenito |
| 5,153,635 A * | 10/1992 | Kahle et al. .................... 355/45 |
| 5,394,766 A * | 3/1995 | Johnson et al. ............ 74/490.1 |
| 5,580,255 A | 12/1996 | Flynn |
| 5,779,484 A * | 7/1998 | Lampotang et al. .......... 434/266 |
| 6,077,083 A * | 6/2000 | Smith-Whitley et al. .... 434/262 |
| 6,273,728 B1 * | 8/2001 | van Meurs et al. .......... 434/268 |
| 6,336,047 B1 * | 1/2002 | Thu et al. ...................... 607/5 |
| 6,910,896 B1 * | 6/2005 | Owens et al. ............... 434/267 |
| 2004/0157199 A1 * | 8/2004 | Eggert et al. ................ 434/262 |

FOREIGN PATENT DOCUMENTS

| | | |
|---|---|---|
| DE | 19714684 A1 | 10/1998 |
| WO | 9705592 A1 | 2/1997 |

* cited by examiner

MEDICAL PATIENT STIMULATOR

The present invention regards a medical patient simulator, in particular a simulator for simulating an infant and its physiological responses.

The invention concerns systems intended for patient simulators (particularly manikins) used for medical teaching and training. It is an object for the manikin to exhibit various signs of illness as well as both normal and abnormal bodily functions in order to allow the users to make a diagnosis and take corrective measures.

The background for a first aspect of the invention is a request from the market for a simulation of the breathing pattern called sub-costal retractions, so as to provide a basis for diagnosing breathing problems in the patient. Today there are no patient simulators in existence that mimic this particular breathing pattern.

Chest retractions occur when a patient has difficulties breathing due to an obstruction of the respiratory passage or severe asthma and the lungs use a great amount of force in order to get the air through. The retractions are visible as a cavity in the diaphragm (the skin is "sucked" in between the ribs and at the lower edge of the ribs, i.e. below the sternum).

The above mentioned object is achieved by using means that pull the chest skin down in an area that corresponds to an area where such retractions would occur on a human being.

Preferably this can be done by attaching or integrating an elastic strap to the inside of the chest skin in the middle of the area where retractions occur.

In a preferred embodiment a pneumatic mechanism pulls this strap in a manner which is synchronized with the lungs' raising and lowering of the chest, giving the desired cavity in the skin over the diaphragm.

This makes it possible to practice the diagnosing and treating of a respiratory problem in a way which is currently not possible with any other patient simulator. Preferably the function can be switched on and off from the instructor's PC or via remote control.

In alternative embodiments the strap may be glued or welded to the chest skin. Most preferably the strap is moulded integrally with the rest of the skin. The latter allows for more efficient production.

Preferably the skin can be pulled down by pneumatics and a lever mechanism.

Alternatively the skin can be pulled down by en electromechanical mechanism, e.g. an electric motor or a solenoid.

As an alternative to a strap magnetic material may be fixed to or moulded to the relevant area of the chest skin. Pull-down is carried out by activating an electromagnet placed a distance under the skin.

In a further alternative embodiment the retractions may occur as a result of suction on the underside of the area in question. Such a solution may also be used to simulate intercostal and mid-clavicular retractions. In practice the suction effect can be produced by forming a closed space underneath the skin through:

- Moulding vertical walls as a continuous "skirt" around the relevant area, sealed with a rigid "lid" at the bottom. The lid at the bottom is equipped with a nipple for evacuation of air and is prevented from being pulled up when the air is sucked from the space.
- Welding a foil against the underside of the skin so as to form a funnel down towards a central air nipple. The nipple is prevented from being pulled up when the air is sucked from the space.
- Leave the skin placed across a sealed "cup" shaped according to the anatomy of the area in question. The brim of the cup seals against the skin. The air can be evacuated through pumping or by the walls of the cup acting as a cylinder in which a piston is pulled down to create the vacuum.

In a second aspect of the present invention the aim is to achieve a patient simulator that allows for a change in the compliance of the lungs, i.e. the resistance offered by the lungs when ventilated (artificial respiration). This provides an opportunity for practicing diagnosis and treatment of a respiratory problem, which today does not exist in any other patient simulator. Preferably the function can be switched on and off from the instructor's PC or via remote control.

There is no other patient simulator in existence today which can offer different degrees of lung compliance.

Different compliance of the lungs can according to the invention be simulated by placing the lung or lungs between two plates in the chest. The spacing between the plates or their resistance against moving apart can be altered, so that it becomes more difficult to inflate the lungs.

As an example, the lower plate may be fixed while the upper plate is movable. The upper is forced up when the lung is inflated through artificial respiration, simulating lifting of the chest. The normal resistance against this ventilation is caused by the chest skin stretching when the chest lifts. In order to initiate an increase in the inflexibility of the lungs an actuator is activated, which pulls the upper chest plate down towards the lower plate. This applies a pressure to the lung sack and makes it more difficult for the user to blow air into the lungs. The actuator may include e.g. a pneumatically operated mechanism.

In an embodiment of the invention the tightening of the plates enclosing the lung sack can be carried out by an electromechanical mechanism.

The elastic body may be an elastic strap, band or a tension spring.

Optionally the force may be inverted so that a compression spring or a soft compressible body provides the resistance against lung expansion.

In the case of pneumatic operation of the actuator for moving the upper plate the elastic body may be replaced by a rigid locking mechanism. The air cushion tensioning the locking mechanism will then provide the required resilience. Alternatively, variable compliance of the lungs may also be achieved by varying the tightening of the chest skin. This may be done e.g. by a pneumatic or electromechanical mechanism pulling at the attachment points of the skin at the sides or back of the manikin, causing the skin to tighten across the chest, thus offering increased resistance against expansion of the lung sack.

A third aspect of the present invention provides a patient simulator that is capable of simulating muscular activity in the patient.

The background for this is an idea of increasing the realism of the simulator by using the electropneumatic control system already present in the simulator to simulate muscular activity in the patient and also simulate a physical response to the electric shock to which a patient is subjected during defibrillation of the heart.

A simulator is known in which an arm can be moved to simulate muscular activity. A BLS manikin was previously on the market, which through an electromechanical solution could provide a physical reaction to defibrillation. The reason why this manikin is no longer available is unknown; neither is it known whether the chosen technical solution was satisfactory.

However there are no simulator manikins that can move the actual torso in order to simulate spasm or the first signs of consciousness upon waking up from general anaesthesia and similar. Movement of the actual torso in order to give signs of life is not known from any other patient simulator.

A system has therefore been developed to simulate both normal and abnormal body movements and reactions to defibrillation. According to the invention this is solved by the torso comprising at least two actuators arranged on the right and left sides, respectively, of the backside of the torso, which actuators are arranged to be operated in the following modes:

for simulation of normal muscle movement, alternate and regular activation of the actuators on the left and right sides, for simulation of muscle spasms; rapid and irregular activation of the actuators on the left and right sides, for simulation of defibrillation; rapid activation of both actuators simultaneously, once for each defibrillation.

Preferably the actuators are air cushions.

Preferably there is one air cushion disposed on the right side and one on the left side. When air is injected into these the manikin will lift slightly from the surface on which it has been placed. Initiating rapid and irregular actuation of the air cushions creates random spasmodic reactions. More regular and more complete filling and emptying of the air cushions, alternating between the right and left sides, simulates normal body movements in a patient regaining consciousness.

These patterns of movement can be activated from the instructor's PC or via remote control. In addition the simulator may be equipped with a sensor to detect defibrillation. Upon receiving such an electric shock both air cushions are immediately filled to a maximum level of fill, then to deflate completely again. This results in a rapid lifting and lowering of the body, simulating a human body in which the muscles are tensed by the electric shock.

A fourth aspect of the present invention provides a system for controlling various pneumatic functions in patient simulators (manikins) used in medical education and training. It is important to be able to set many of these functions to various levels, e.g. depth of breathing (degree of lung inflation), degree of swelling of the oral cavity and respiratory passages and the extent of body movements. It must also be possible to limit the maximum pressure to which the actuators are subjected, due to the risk of ruptures and leakage.

Thus it is desirable to achieve control of the actual air pressure in each actuator (air cushion) and then use this actively to control the different functions.

In a currently used technique the pressure in each actuator appears as a function of the fill-up time. The functions are programmed individually based on empirical data for pressure build-up as a function of fill-up time. The problem with this solution is that it requires complete deflation of the individual actuator prior to re-filling. If this is not done the next filling (which takes place over the same period of time as the previous) will come in addition to the air remaining from the previous filling, thus creating an excessive pressure. This problem arises upon repeated activation at a high frequency (e.g. when simulating rapid breathing). As this system includes no pressure feedback, repeated filling without sufficient time for complete deflation will lead to an increased build-up of pressure. In many cases this has caused actuators (air cushions) to rupture as a result of overpressure.

The present invention therefore proposes to measure the pressure of each actuator and use the pressure values to set a limit for the degree of fill. In order to avoid having to use a double set of air hoses (one for air into and out of the actuator and one for pressure measurements) in manikins where there may already be many hoses and little room, the pressure is measured closer to the pressure source (the valve) for the individual actuator. In order to minimize the effect of a pressure overshoot immediately after opening the valve, the pressure is measured after a nozzle that restricts the air flow and provides pressure measurements that are approximately equal to the pressure in the actuator. For functions where fast filling (i.e. high air flow) is important a throttle-free system may be used. The pressure in the air bladder is then measured by the pressure sensor being connected directly to the bladder via a separate hose.

A fifth aspect of the present invention aims to provide variable fontanelles in an infant simulator.

According to the invention this is provided by arranging one or more air cushions in at least one fontanelle area on the head of the simulator, which air cushion(s) can be inflated with air in order to simulate an increased pressure in the brain.

The various aspect of the invention will now be described in greater detail through examples of embodiments and with reference to the accompanying drawings, in which.

Figure 1:
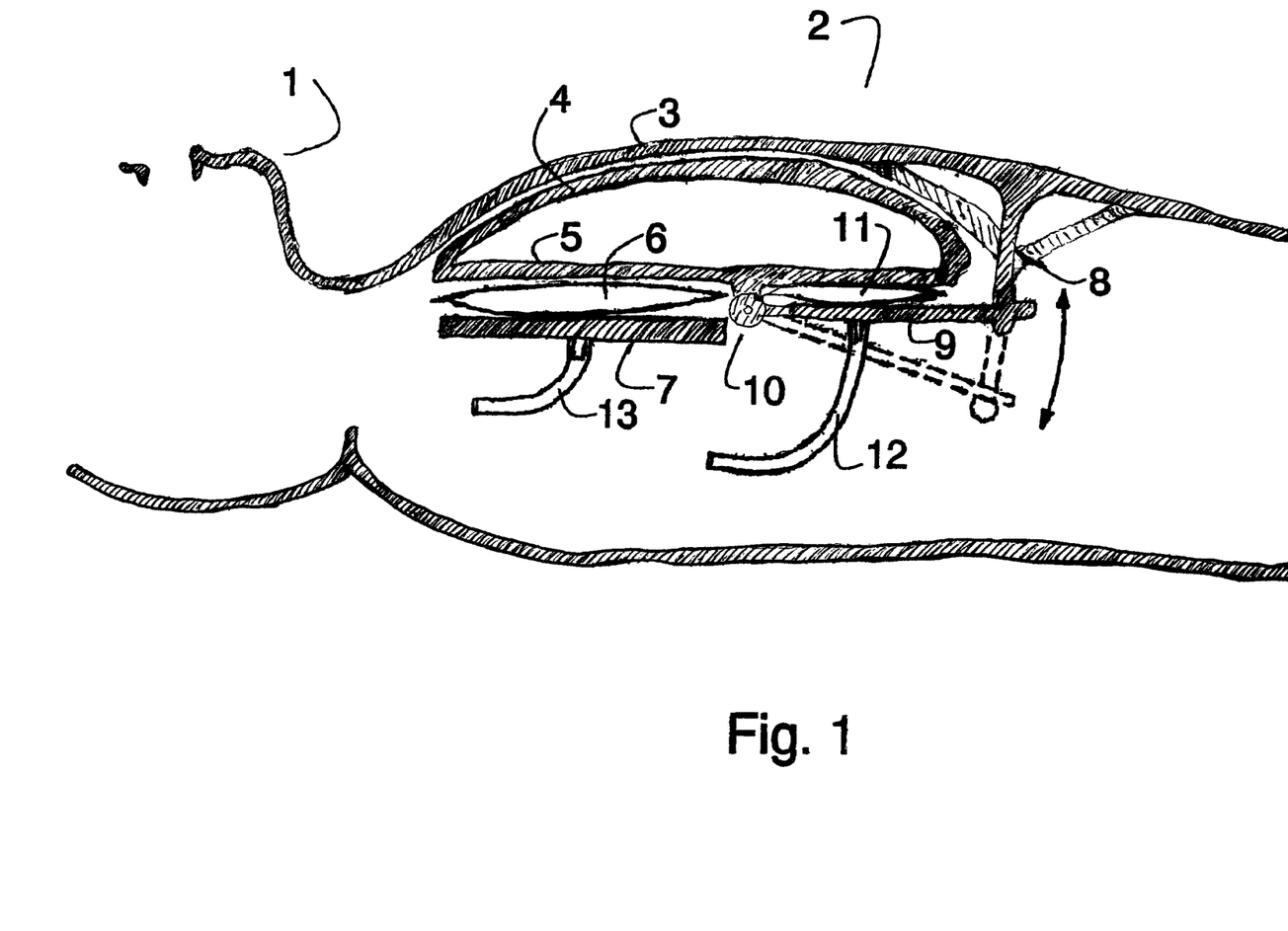
FIG. 1 is a longitudinal section through a patient simulator.

When in the following the orientational terms "over" and "under" are employed, this should be understood to be in relation to the figures, in which the patient simulator is depicted as lying on its back. Other orientational terms used are "below" and "above". These relate to the manikin in the upright position. The use of these terms is purely practical and is intended to simplify the description of the invention, and shall in no way be taken to impose any limitations on the positions in which the invention may be used FIG. 1 is a longitudinal section through a patient simulator, showing part of a head 1 and part of a torso 2. The torso 2 comprises a chest skin 3. Under the chest skin is a shell 4 to represent ribs and sternum. Under this shell is a first plate 5, which may also be termed an upper plate. Under the plate 5 is one or preferably two lungs 6, one on the right side and one on the left side of the rib cage. Under the lung(s) 6 is a second or lower plate 7.

An area of the chest skin 3 below the shell has a strap 8 attached to it or integrated into the chest skin. Preferably this is done by moulding the chest skin 3 and the strap 8 at the same stage.

The strap 8 is connected to a lever 9 designed to pull on the strap 8. One end of the lever 9 is supported in a hinge 10. Between the lever 9 and the upper plate 5 is an air cushion 11. The air cushion 11 is connected via a hose 12 to a source of compressed air (not shown). The lung 6 is connected to a source of compressed air (not shown) via a hose 13.

In the case of simulated breathing with retractions air is repeatedly pumped into the lung(s) 6 and then released. The filling of the air cushion 11 takes place in time with this inflation and deflation of the lung(s) 6. This filling takes place at the specific point during the lung inflation which best corresponds to the time of retraction in a human being.

When the air cushion 11 is filled, the lever 9 rotates about the hinge, and the outer end of the lever 9 moves down (in FIG. 2), as indicated by the dotted line. This pulls the strap 8, pulling the chest skin 3 down in the area around the strap 8, as indicated by the dotted line.

Figure 2:
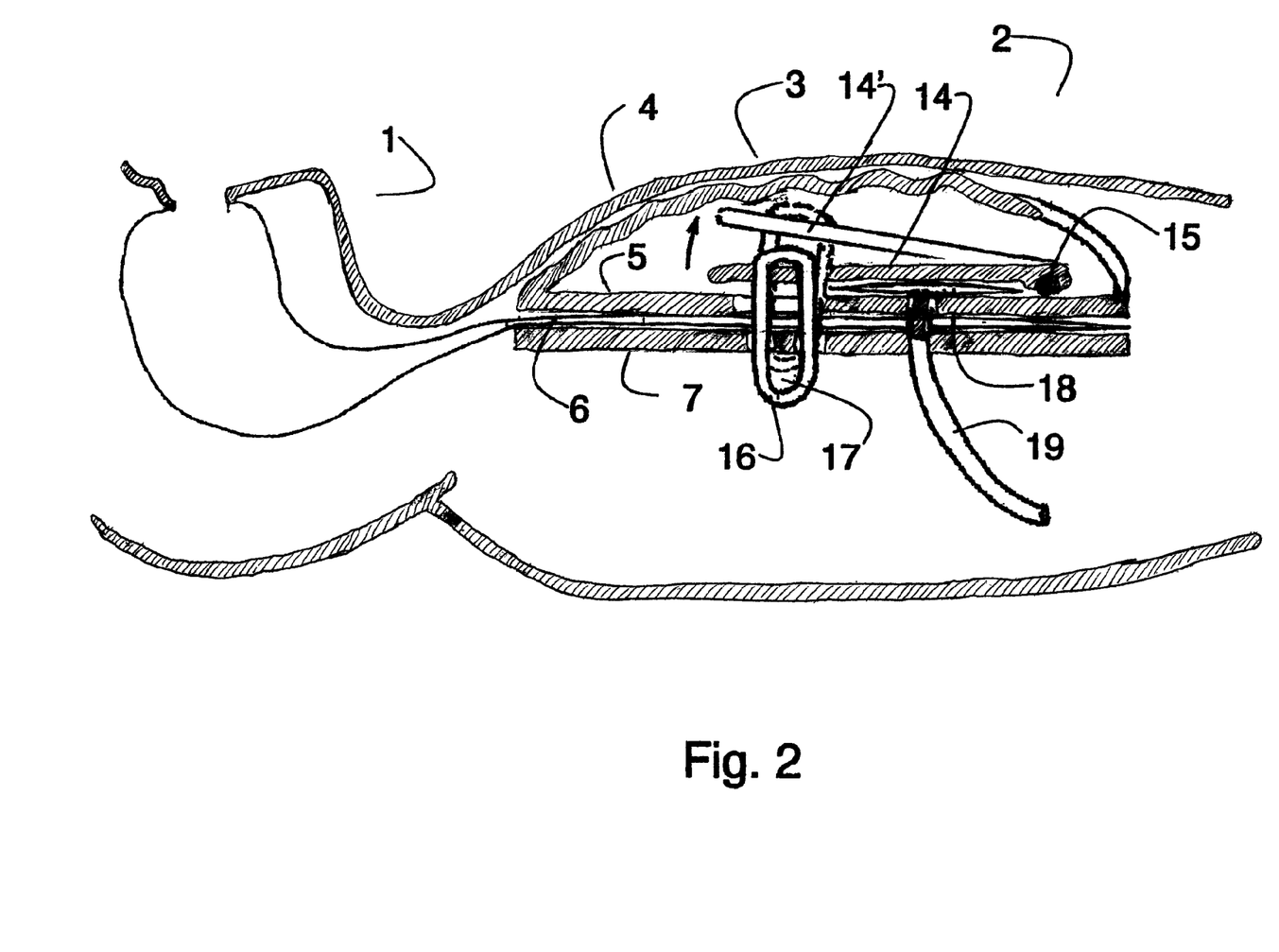
FIG. 2 is a longitudinal section through a patient simulator.

When the retraction function is not in use, the mechanism will have no visible effect on the chest skin. This is due to the fact that the lever 9 is attached to the upper plate 5, moving entirely with this.

FIG. 2 is a longitudinal section similar to FIG. 1. However, FIG. 2 also shows a mechanism for reducing the plate's 5 mobility. This comprises a lever 14, one end of which is supported at a hinge 15. The opposite end of the lever 14 is connected to a flexible body 16.

The flexible body 16 is functionally engaged with the lower plate 7. To make sure the elastic strap does not prevent the plate 5 from moving in the case of normal lung compliance, the strap has some slack with respect to the plate 7, indicated at 17. The strap 16 may be an endless elastic band, as shown.

An air cushion 18 is arranged between the plate 5 and the lever 14. This is connected to a source of compressed air (not shown) via a hose 19. When the air cushion fills with air the lever 14 is lifted to the position indicated by the dotted line at 14'. Thus the slack between the strap 16 and the plate 7 is reduced or eliminated. Upon subsequent filling of the lung 6 the strap 16, which acts between the lever 14 and the lower plate 7, will counteract the movement of the upper plate 5 away from the lower plate 7. This will make the lungs feel less compliant, as it becomes more difficult to fill them with air.

Figure 3:
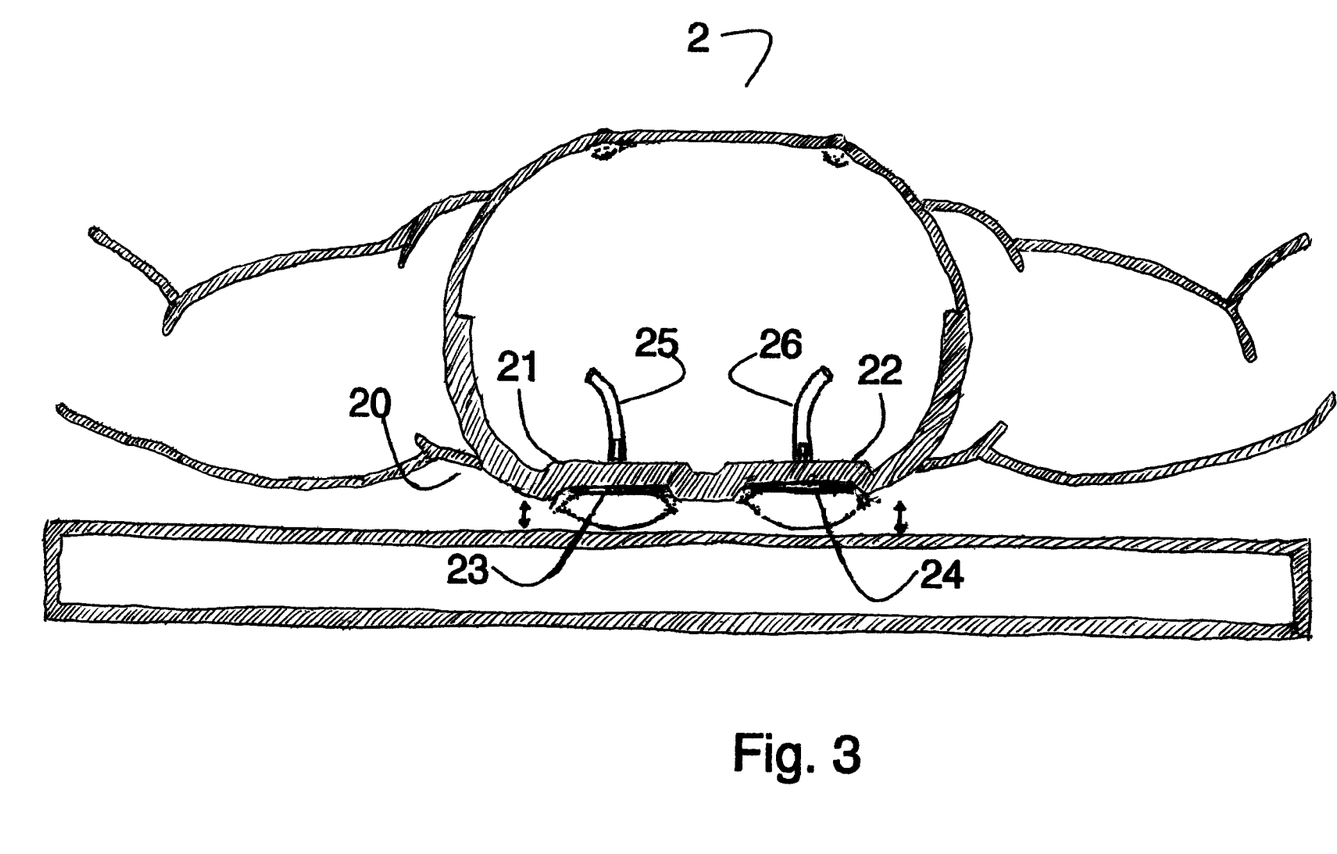
FIG. 3 is a cross section through a patient simulator.

FIG. 3 is a cross section through the torso 2 of a patient simulator, illustrating a back shell 20. The back shell serves to reinforce the torso. On the outside of the back shell 20 are two recesses 21 and 22, on the left and right sides of the torso, respectively. In each recess 21, 22 is an air cushion 23 and 24, respectively. The air cushions 23, 24 are connected to a source of compressed air (not shown) via respective hoses 25, 26.

Preferably rapid deflation of the air cushions is achieved by using a three-way valve (not shown) both for filling and emptying the air cushions. Filling and emptying takes place through the same hose 25, 26. Upon activation of the valve it opens for compressed air from the compressed-air source, and the air cushions are inflated. As soon as the valve is deactivated it closes to compressed air, and the air in the air cushion passes back through the valve and out into the atmosphere.

As an alternative but suboptimal solution the air cushions can be provided with an orifice which allows rapid deflation after inflation. The orifice is shaped so as to be too small to allow rapid inflation of the air cushion with a fast flow of compressed air, but large enough to give a rapid deflation when the flow of compressed air stops.

The air cushions 23, 24 can be used in the following modes:

Simulation of normal muscle movements: Alternate and regular filling and emptying of air on the left and right sides.

Simulation of muscle spasms: Rapid and irregular (arbitrary) filling and emptying (inflation and deflation) of the right and left air cushions. The inflation and deflation may in some cases be complete and in some cases incomplete.

Simulation of defibrillation: Rapid filling of both air cushions simultaneously, once for each defibrillation.

In the case of defibrillation the electrical current from the defibrillator is detected, and the control system of the patient simulator is set to defibrillation mode. Consequently the cushions will be filled rapidly and simultaneously when the electric shock is triggered.

Figure 4:
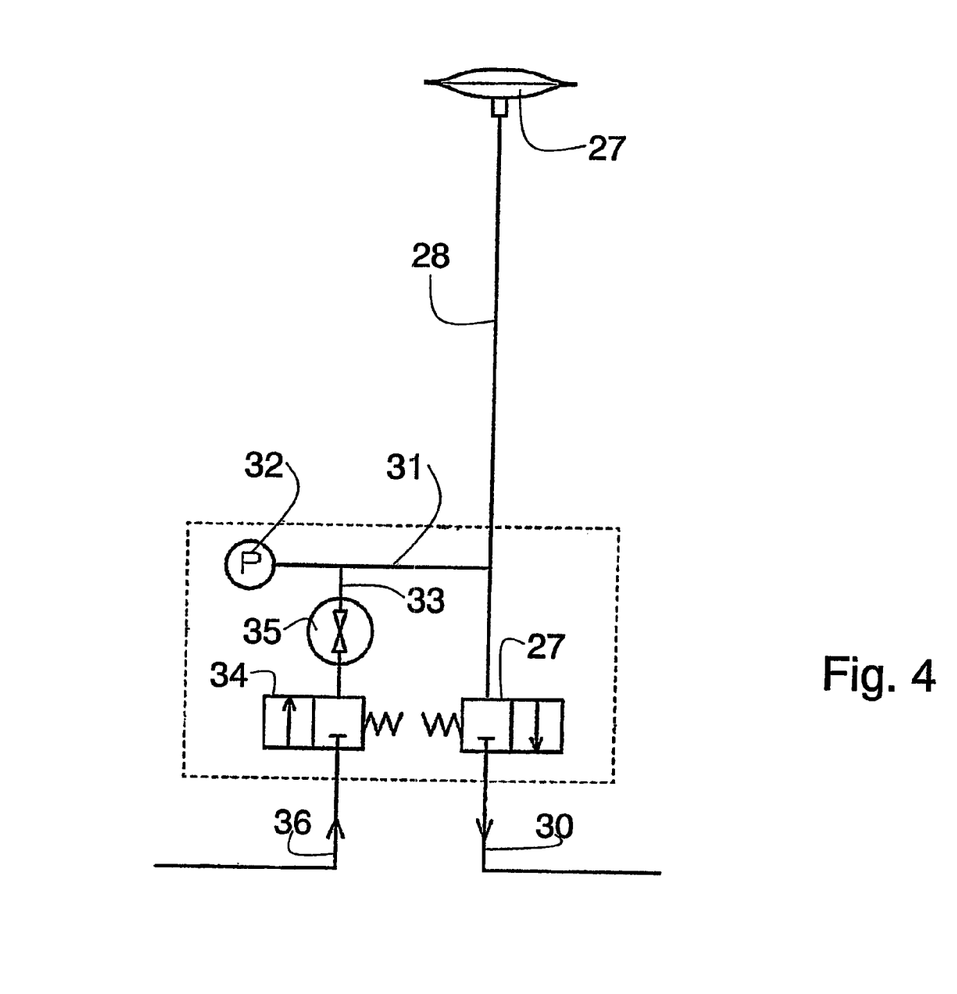
FIG. 4 is a schematic diagram showing an air control system according to the invention.

FIG. 4 is a schematic view of a control system for regulating the filling of air cushions and/or lungs in a patient simulator.

A pneumatic actuator (e.g. air cushion or lung) 27 is connected to a hose 28. The hose is connected to a purge valve 29 with an air outlet 30. The hose 28 is also connected to a first air duct 31, which in turn is connected to a pressure sensor 32.

The air duct 31 is also connected to a second air duct 33, which in turn is connected to a fill valve 34. The fill valve 34 is again connected to a source of compressed air (not shown) via an inlet 36. The second air duct 33 includes a throttle regulator or nozzle 35.

Together, the fill valve 34, the purge valve 29, the nozzle 35, the pressure sensor 32 and the first and second air ducts 31, 33 form a control unit 37 and are located in physical proximity to each other and at a distance from the actuator 27.

When the actuator 27 is to be filled with air the fill valve is manipulated to the open position. At this the air flows via the second air duct 33 and the nozzle 35 into the first air duct 31 and on to the hose 28 and the actuator 27. The nozzle 35 provides pressure equalization to make the pressure in the first air duct 31 (which is the pressure sensed by the pressure sensor 32) approximately equal to the pressure in the actuator 27. The nozzle 35 will delay the inflation of the actuator 27 slightly but not significantly. Therefore the throttling of the nozzle 35 is a compromise between rapid filling of the actuator 27 and pressure equalization between the pressure sensor 32 and the actuator 27. The arrangement of the nozzle 35 will therefore be dependent on the function of the actuator 27. With actuators that require rapid filling, e.g. the above air cushions 23 and 24, the throttling in the nozzle 35 must only restrict the air flow to the actuator to a small extent. In these cases the preferred solution is one in which the pressure is measured in the actual actuator by connecting the pressure sensor directly to the volume therein via a separate hose.

With a lung 6 the inflation takes place over a longer time. However, it is now even more crucial to control the pressure. Therefore the pressure equalization requirements are stricter and the throttling must to a greater extent slow the air flow.

The fill valve 34 closes when the pressure in the first air duct 31 reaches a desired value. If the actuator 27 is to be deflated again immediately (as in the case of a lung) the purge valve 29 is opened and the air is released.

If the actuator 27 is not completely empty of air prior to the commencement of the next inflation (which may easily happen e.g. in the case of a simulation of rapid breathing) the pressure in the actuator, hose 28 and the first air duct 31 will be higher than it was at the commencement of the previous inflation. However the pressure sensor will stop the inflation at the same pressure as before. Overinflation of the actuator and any rupturing of this is therefore prevented.

Figure 5:
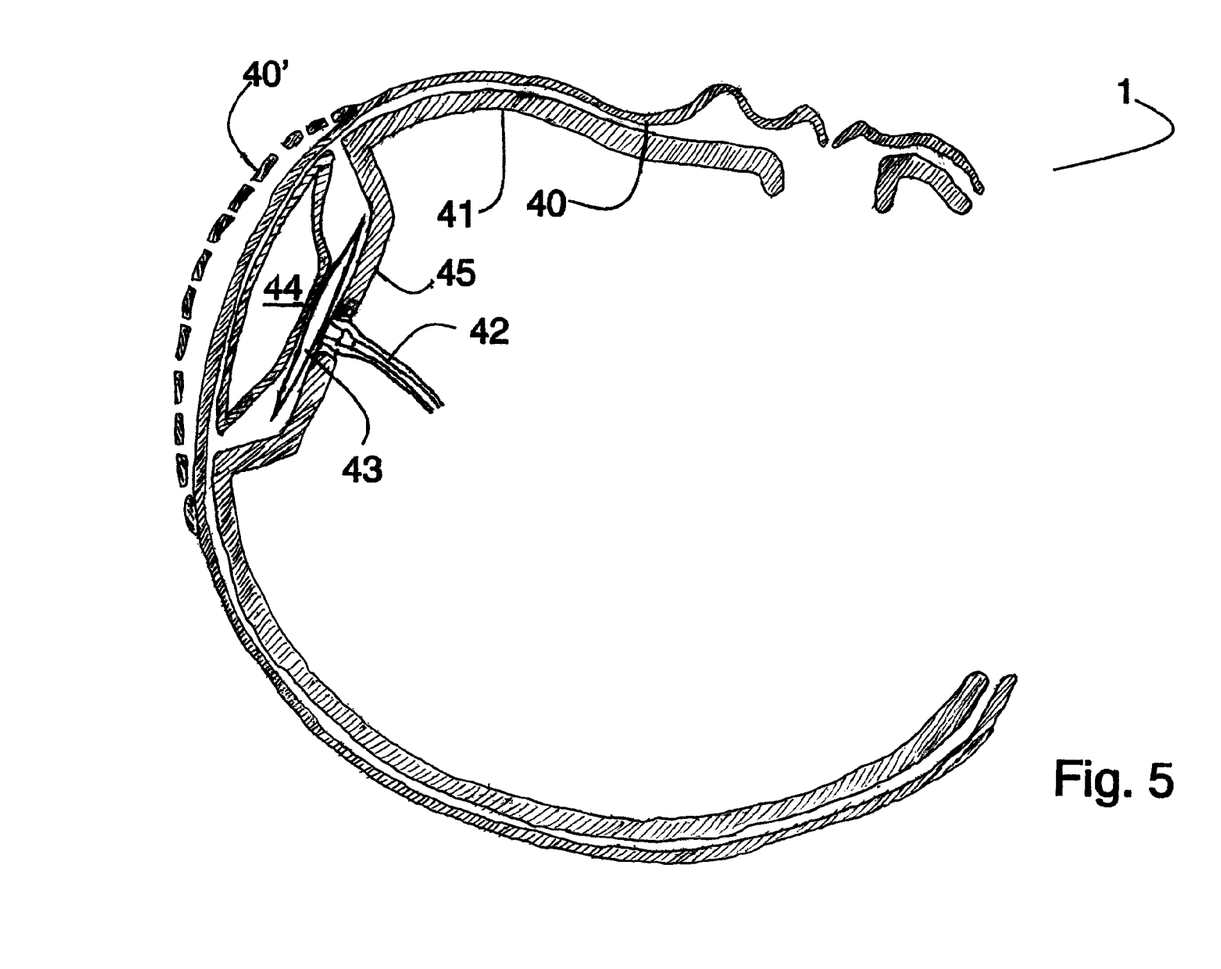
FIG. 5 is a longitudinal section through the head of a patient simulator.

FIG. 5 is a longitudinal section through the head 1 of the simulator. The head 1 comprises an inflexible inner shell 41 covered in a soft skin 40. In an area of the head corresponding to where the greater or front fontanelle is found on an infant, is a recess 45 in the inner shell 41. In this recess there is provided an air cushion 43 connected to a source of compressed air (not shown) via a hose 42. A flexible body 44 such as a block of foam rubber is arranged between the air cushion 43 and the skin 40.

In order to simulate an increased pressure in the brain the air cushion 43 is inflated from the air source via the hose 42, pushing the flexible body 44 against the skin 40, causing this to move outwards. This is indicated by the dotted line 40' and forms a swelling in the head 1. The swelling in the head 1 will be visible and feel soft and yielding, as will be the case with a real patient. Releasing the air from the air cushion 43 will cause the swelling to disappear, as the flexible body 44 returns to the recess 45. If so desired, the manikin can also be provided with a similar device in the area where the smaller or rear fontanelle is found on an infant.

Figure 6:
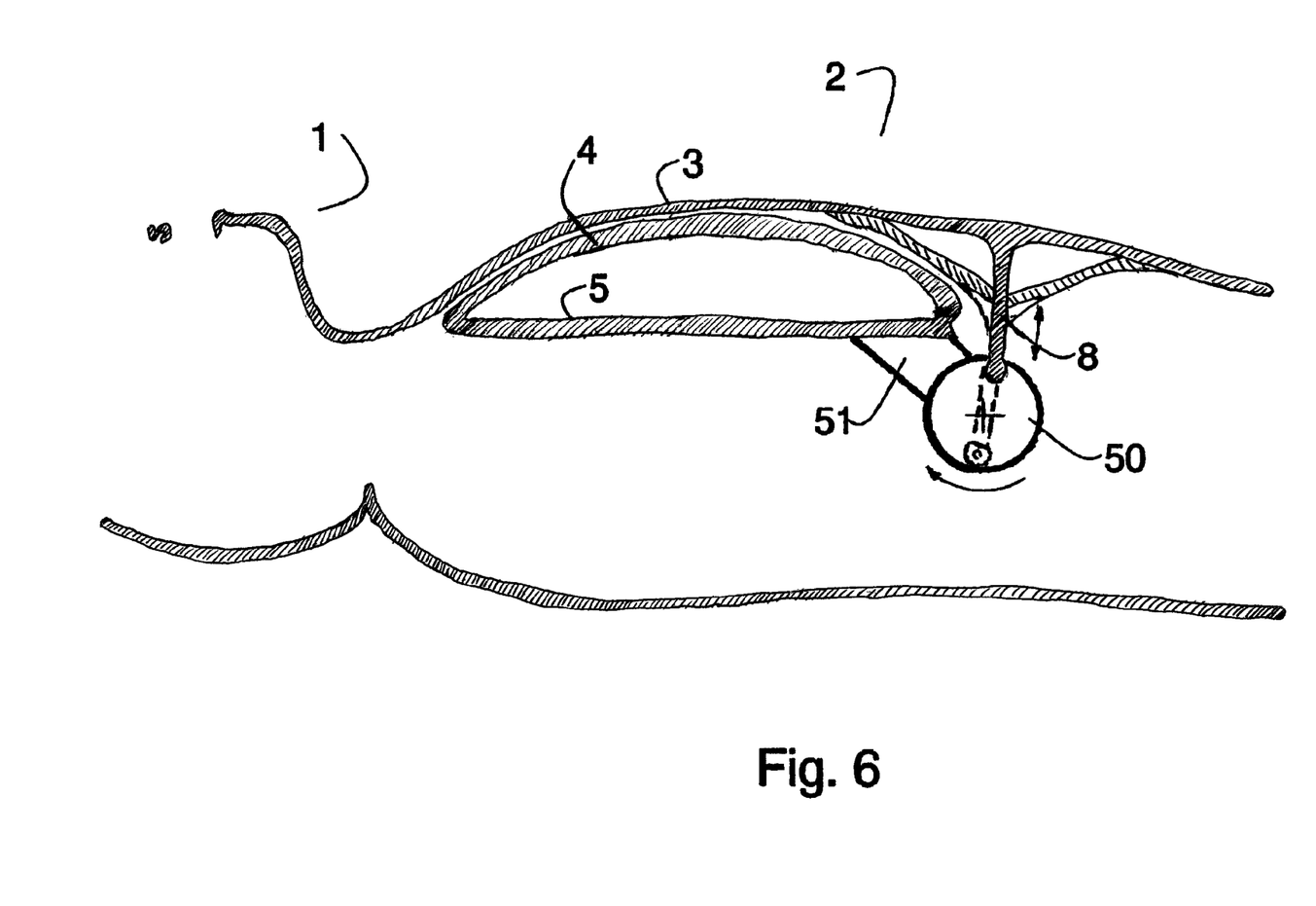
FIG. 6 is a longitudinal section through a patient simulator.

The above describes the use of pneumatic devices in the present simulator in order to realize different illnesses together with normal and abnormal bodily functions. It is also possible to use other means that the above described pneumatic devices to achieve the same effects. FIG. 6 shows an alternative solution for visualising the retraction function, which is also described with reference to FIG. 1. In the embodiment shown in FIG. 1 the retraction function is achieved by attaching the lower end of the strap 8 to a rotating wheel in an eccentric fashion. The rotating wheel is driven by a motor (not shown) and is attached to the upper plate 5 via a fastening stay 51. Upon rotation of the wheel 50 this will produce a retraction of the chest skin 3, in the same manner as described above. The frequency and timing of the retractions can be controlled by adjusting the wheel 50 rotation. It would be appropriate to replace the wheel 50 with a crank handle.

Other situations that are obvious to a person skilled in the art can also be realized by means of mechanical devices.

The invention claimed is:

1. A medical patient simulator for simulation of subcostal retractions of an infant, comprising:
   a torso containing at least one artificial lung adapted for inflation by external air supply and a sternum;
   a chest skin placed at least partially on the outside of the torso;
   a means for pulling down the chest skin providing an external visible depression of the skin below the sternum of the torso;
   where the means includes a mechanism adapted to pull the chest skin in a synchronous fashion with the at least one lung raising and lowering the chest, said means further including an elastic pulling strap attached to the inside of the skin approximately in the middle of the area where subcostal retractions occur;
   said means and said artificial lung being coupled so that when said means are actuated to pull in the chest skin, said means and said artificial lung are adapted to move synchronously.

2. A medical patient simulator according to claim 1, wherein the mechanism is a pneumatic mechanism including a bellows.

3. A medical patient simulator, in particular a simulator for simulation of an infant, comprising:
   a torso containing at least one lung, with the option of altering the compliance of the at least one lung, where the at least one lung is disposed between a first and second plate in the torso, the spacing of the plates being adjustable, the second plate being fixed relative to the torso, and the first plate being movable relative to the torso;
   a pneumatically driven mechanism being adapted to force the first plate towards the second plate, the pneumatically driven mechanism including a bellows;
   and a flexible means connecting the pneumatically driven mechanism to the second plate to provide the force between the first and second plate, said flexible means having an initial slack so that the first plate is free to move relative to the second plate when the pneumatically driven mechanism is inactive.

4. The medical patient simulator of claim 3 further comprising a third and fourth plate in the torso, and the bellows arranged between the third and fourth plate.

5. The medical patient simulator of claim 4, wherein one of the third and fourth plates is the first plate and is arranged over the lung.

6. The medical patient simulator of claim 3, wherein the flexible means is an elastic strap.

7. A medical patient simulator of claim 3 further comprising a strap for pulling down the chest skin providing an external visible depression of the chest skin below the sternum of the torso, wherein the strap is attached to the chest skin from inside the torso, and wherein the strap and the lung are coupled to move synchronously.

8. A medical patient simulator, in particular a simulator for simulation of an infant, comprising:
   a torso, for simulation of muscle activity in a patient;
   the torso having at least two actuators, the first and second actuator being arranged on the right and left sides, respectively, of the backside of the torso;
   wherein the at least two actuators are being designed to be operated in at least the following modes:
   a mode for simulation of normal muscle movement, alternate and regular activation of the at least two actuators on the left and right sides;
   a mode for simulation of muscle spasms, rapid and irregular activation of the at least two actuators on the left and right sides; and
   a mode for simulation of defibrillation, rapid activation of the at least two actuators simultaneously, once for each defibrillation, wherein the at least two actuators are air cushions situated near the outer surface of the simulator to act between a rigid part of the simulator and a surface upon which the simulator is placed.

9. A medical patient simulator for simulation of subcostal retractions of an infant, comprising:
   a torso containing at least one artificial lung adapted for inflation by external air supply and a sternum;
   a chest skin placed at least partially on the outside of the torso;
   a means for pulling down the chest skin providing an external visible depression of the skin below the sternum of the torso;
   where the means includes a mechanism adapted to pull the chest skin in a synchronous fashion with the at least one lung raising and lowering the chest, said means further including an elastic pulling strap attached to the inside of the skin approximately in the middle of the area where subcostal retractions occur, the mechanism being a pneumatic mechanism including a bellows;
   said means and said artificial lung being coupled so that when said means are actuated to pull in the chest skin, said means and said artificial lung are adapted to move synchronously;
   the medical patient simulator further comprising a chest plate disposed against said bellows of said pneumatic mechanism and said artificial lung, a lever being hinged to said chest plate and being coupled to said elastic strap, said bellows being situated between said lever and said chest plate, and said chest plate, said bellows and said lever being adapted to move with inflation and deflation of said artificial lung.

* * * * *